US006405340B1

(12) United States Patent
Irvin et al.

(10) Patent No.: US 6,405,340 B1
(45) Date of Patent: Jun. 11, 2002

(54) FLEXIBLE METHOD OF ERROR PROTECTION IN COMMUNICATIONS SYSTEMS

(75) Inventors: David R. Irvin, Raleigh; Ali S. Khayrallah, Apex, both of NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/347,251

(22) Filed: Jul. 2, 1999

(51) Int. Cl.$^7$ ............................................... H03M 13/00
(52) U.S. Cl. ........................................ 714/774; 714/758
(58) Field of Search ................................. 714/774, 758

(56) References Cited

U.S. PATENT DOCUMENTS

| | | | | | |
|---|---|---|---|---|---|
| 4,047,151 A | * | 9/1977 | Rydbeck et al. | ............ | 714/774 |
| 5,068,858 A | * | 11/1991 | Blaum et al. | ................ | 714/774 |
| 5,379,305 A | * | 1/1995 | Weng | ........................... | 714/774 |
| 5,444,719 A | * | 8/1995 | Cox et al. | .................... | 714/769 |
| 5,511,079 A | * | 4/1996 | Dillon | ......................... | 714/774 |
| 5,600,663 A | * | 2/1997 | Ayanoglu et al. | ........... | 714/774 |
| 5,734,826 A | * | 3/1998 | Olnowich et al. | .......... | 709/238 |
| 5,778,013 A | * | 7/1998 | Jedwab | ....................... | 714/807 |
| 5,862,160 A | | 1/1999 | Irvin et al. | | |
| 5,996,109 A | * | 11/1999 | Shikakura | .................... | 714/774 |
| 6,009,553 A | * | 12/1999 | Martinez et al. | ............ | 714/784 |
| 6,044,485 A | * | 3/2000 | Dent et al. | ................... | 714/774 |

OTHER PUBLICATIONS

Yuming Lu and Brodersen, R.; Implementation architecture of a variable forward error correction decoder; IEEE Global Telecommunications Conference, The Bridge to Global Integration, 1998; vol. 5, pp. 2840–1847 vol. 5.*

Almulhem, A.; El–Guibaly, F. and Gulliver, T.A.; Adaptive error correction for ATM communications using Reed Solomon codes; Proceedings of the IEEE Southeastcon '96. Bringing Together Education, Science and Technology, pp. 227–230.*

Kressel, U.H.–G. and Bune, P.A.M.; Adaptive forward error correction for fast data transmission over the mobile radio channel; 8th European Conference on Electrotechnics, 1988. Conference Proceedings on Area Communication, 1988 pp. 170–173.*

Boudreau, Bergman, and Irvin; Performance of a Cyclic Redundancy Check and its Interaction with a Data Scramble; IBM J. Res. Develop., vol. 38, No. 6, Nov. 1994, pp. 651–658.

* cited by examiner

Primary Examiner—Albert DeCady
Assistant Examiner—Joseph D. Torres
(74) Attorney, Agent, or Firm—Coats & Bennett, P.L.LC.

(57) ABSTRACT

A flexible method of error coding uses at least two generating polynomials to provide different degrees of error protection and to optionally superimpose a phantom channel on a primary channel, without the need for explicit signaling from transmitter to receiver. An encoded message is CRC decoded on the receive side with at least two different generating polynomials. Based on the results of the twin decoding, the present method can determine which of the generating polynomials was used to encode the message and respond accordingly. For instance, if a particular generating polynomial was used, then this may indicate that a second channel has been superimposed onto the primary channel and that second channel may be extracted. On the other hand, if another generating polynomial, such as the default generating polynomial, was used, this may be used to indicate that no second channel has been superimposed. In some embodiments, the method may optionally be refined by adding additional steps to resolve potential ambiguities resulting from the use of a twin decoding scheme. In essence, the receiver deduces the transmitter's choice of CRC generating code, and thus the degree of redundancy and/or presence of the second channel, by analyzing the incoming bit stream rather than relying on explicit signaling information and, armed with that knowledge, responds accordingly.

29 Claims, 3 Drawing Sheets

FLEXIBLE METHOD OF ERROR PROTECTION IN COMMUNICATIONS SYSTEMS

FIELD OF THE INVENTION

The present invention relates to the field of error protection in communications systems, and more particularly to a method of cyclic redundancy check error protection that allows for varying degrees of protection, and optionally the inclusion of second channel data in a primary channel message.

BACKGROUND OF THE INVENTION

Communications systems, such as a cellular telephone networks, routinely include error-control mechanisms intended to provide some degree of protection against transmission errors. Such transmission errors typically arise from external disturbances (e.g., "noise") and have the undesired effect of altering the message received.

Assuming a digital communications system, a plurality of bits to be communicated are typically collected and grouped into a packet. A packet header is typically appended to the beginning of the packet that includes various fields needed to enable and assist in the operation of various network functions. A packet trailer is typically appended to the end of the packet and typically includes, inter alia, parity bits. Together, the header, packet, and trailer is called a frame. The purpose of the parity bits carried by the frame trailer is to provide a means of detecting the presence of any bit errors introduced into the frame during the overall transmission process.

One particular method of generating and processing parity bits is the cyclic redundancy check (CRC), whose operation can be envisioned most clearly as a series of multiplication and division operations among polynomials having modulo-2 coefficients in recognition of their representation of digital bits. In this representation, the contents of a partial frame (i.e., the frame excluding its trailer) can be thought of as an N-degree polynomial, where N is the number of bits in the partial frame. This polynomial is divided by a second polynomial known as the CRC generator polynomial. On completion of the division, the resulting remainder is incorporated into the packet trailer as the parity bits, and the frame is passed on for transmission.

Upon receipt of the frame, the receiver again computes the polynomial division, and compares the resulting remainder with the received remainder. Transmission errors are indicated by any disagreement between the remainder as conveyed by the received frame and the remainder as re-computed by the receiver.

The polynomial CRC model, as well as the limitations and capabilities inherent in CRCs derived from various generator polynomials in widespread commercial use, are described more fully by Boudreau, Bergman, and Irvin, in "Performance of a cyclic redundancy check and its interaction with a data scrambler" (IBM Journal of Research and Development, vol. 38, no. 6, November 1994, pp. 651–658).

With the use of CRC encoding, it is necessary for the receiving station to be aware of which generating polynomial was used to produce the incoming message in order to properly process the message. Typically a standard or universal generating polynomial of appropriate degree is used. However, this approach, which is often designed to account for worst-case scenarios, may be inefficient in the majority of situations where noise is less than worst-case conditions. For instance, a given frame might need to be sent with sixteen-bit CRC protection in noisy situations, but only eight-bit CRC protection may be required when transmission conditions improve. However, under the prior art, the sixteen-bit CRC protection is used for all situations.

In addition, it is sometimes useful to provide a low-bit-rate phantom Second channel between the transmitter and the receiver, for example, for use in exchanging network-management information, as discussed further in U.S. Pat. No. 5,862,160. Here, the term "phantom channel" suggests that the organization of the fixed-length frame—in particular the frame length of the message protected by the CRC—does not vary as the result of providing the phantom channel. For proper functioning, it is necessary for the receiver to know when the second channel is present so that the second channel may be properly processed. One known approach is to always reserve space in the frame for this second channel. However, this approach is clearly an inefficient use of transmission capacity when the second channel is empty. Another approach is to provide an indicator flag explicitly. For example, a second-channel-present flag can be provided that explicitly tells the receiver when the second channel is not empty. However, the use of such an explicit flag approach likewise consumes transmission capacity that might otherwise be used productively.

An alternative approach is disclosed in U.S. Pat. No. 5,862,160 to Irvin and Khayrallah, which is incorporated in its entirety herein by reference. The '160 patent describes a way in which a phantom secondary channel can be derived by deliberately inducing CRC errors. A mask that corresponds to the information to be carried by the secondary channel is exclusive-ORed (XOR) with the information to be carried by the primary channel after the CRC is computed for the primary channel information. On receipt of the altered message, the decoder detects an abnormality, as the CRC bits received do not correspond to the message received, due to the imposition of the mask. The decoder then finds the mask that unravels this imposition, and therefore restores the integrity of the CRC. That found mask then represents the intended text of the secondary channel. Although the method of the '160 patent can be applied to some of the problems addressed by the present invention, the method of '160 becomes prohibitively complex as the capacity of the secondary channel increases. For example, providing an eight-bit secondary channel would require the storage and processing of 256 masks.

Therefore, there remains a need for a method that provides variable levels of CRC protection that is efficient in its use of transmission resources. In addition there is a separate need for an efficient method of CRC protection that allows for secondary channels of various capacities while being efficient in its use of storage, meaning that a large catalog of masks is not required for a multi-bit secondary channel, and universal, meaning that the same method can provide both a single-bit phantom channel as well as a multi-bit secondary channel. Further, there is a need to provide these options within the context of existing systems and standards, so that their capabilities can expand and yet remain backwards-compatible.

SUMMARY OF THE INVENTION

The present method uses at least two generating polynomials, or generating codes (also known as "generator codes"), to help determine when different degrees of error protection are being employed, and optionally to detect the presence of a phantom channel on the primary channel, without the need for explicit signaling from transmitter to receiver. In essence, the receiver deduces the transmitter's choice of CRC generating code by analyzing the incoming bit stream rather than relying on explicit signaling information and, armed with that knowledge responds accordingly.

In contrast with prior art approaches that decode the CRC encoded message using only a single generating polynomial, the present method CRC decodes the encoded message on the receive side with at least two different generating polynomials. Based on the results of the twin decoding, the present method can determine which of the generating polynomials was used to encode the message and respond accordingly. For instance, if a particular generating polynomial was used, then this may be used to indicate that a second channel has been superimposed onto the primary channel and that second channel may be extracted. On the other hand, if another generating polynomial, such as the default generating polynomial, was used, this may be used to indicate that no second channel has been superimposed. In some embodiments, the method may optionally be refined by adding additional steps to resolve potential ambiguities resulting from the use of a twin decoding scheme. These steps may include deliberately altering the primary message by XOR adding known offset polynomials to the message prior to differentiate the CRC decoding results using the different generating polynomials. The alterations may then be removed at the receive end to reconstruct the original message.

The present method increases processing overhead for at least the receiver, and typically the transmitter. Offsetting this, however, is an increase in transmission capacity. In the simplest embodiments, the present method allows the degree of redundancy in CRC encoding to be varied as necessary without the necessity of transmitting an explicit indicator flag bit or the like. In more complex embodiments, the present method allows a second channel to be phantomed onto the primary channel, once again without transmitting an explicit indicator flag bit or the like. Instead, the receiver deduces the transmitter's choice of CRC generating code, and thus the degree of redundancy and/or presence of the second channel, by analyzing the incoming bit stream rather than relying on explicit signaling information.

DETAILED DESCRIPTION

For simplicity, the present invention will be described in the context of a digital cellular telephone communications network. However, it is to be understood that the invention is not to be limited thereby and encompasses a wide variety of communications systems, including both wired systems and wireless systems.

Figure 1:
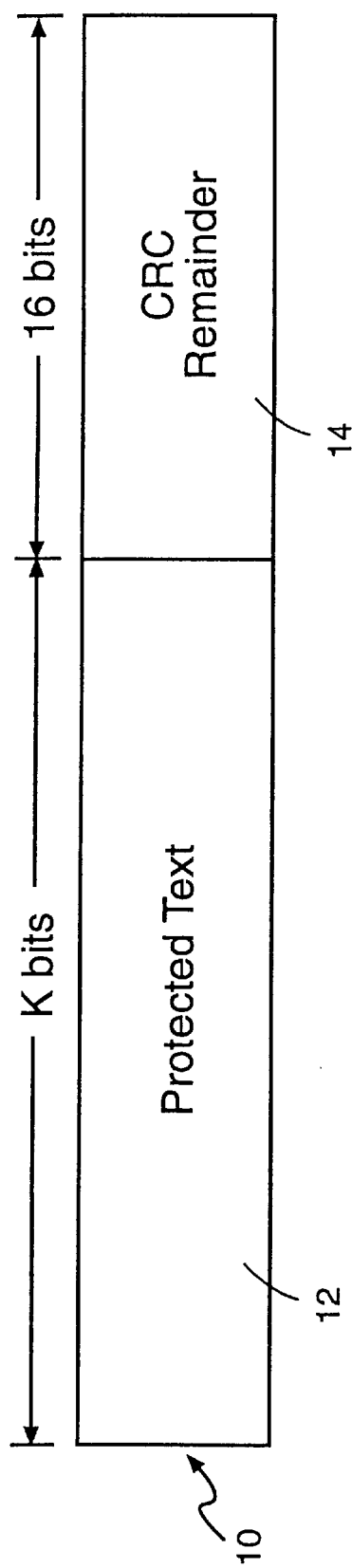
FIG. 1 shows an encoded message frame of the prior art.

As described above, transmit data is typically collected and grouped into a plurality of packets, called frames 10. A representation of such a prior art frame 10 is shown in FIG. 1. For purposes of discussion herein, the frame 10 may be divided into two portions, a message portion 12 and a redundancy portion 14. The sequence of the two portions is unimportant, but typically the redundancy portion 14 follows the message portion 12. The message portion 12, sometimes referred to as the protected text, includes message data, optionally encoded by any method known in the art. The redundancy portion 14 includes redundancy information (e.g., a CRC remainder). The frame 10 has an overall frame length, typically measured in bits. The frame 10 of FIG. 1 is shown as having a message portion 12 of K bits, with a sixteen bit redundancy portion 14.

Figure 2:
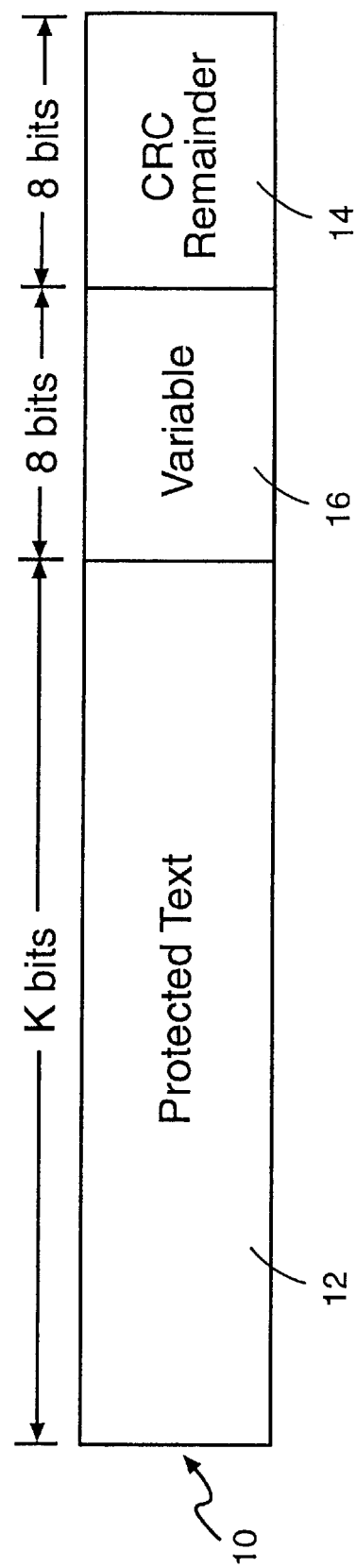
FIG. 2 shows one embodiment of a message frame of the present invention.

An alternative frame configuration is shown in FIG. 2. The frame 10 of FIG. 2 likewise includes a message portion 12 and a redundancy portion 14, but also includes a variable portion 16. For simplicity, the message portion 12 is the same length, and contains the same information, as in FIG. 1. The redundancy portion 14 of FIG. 2 is only eight bits long and contains redundancy information. While this redundancy information is generally similar to the redundancy information of the FIG. 1 redundancy portion 14, this redundancy information is different than that of the redundancy portion 14 of FIG. 1, as will be described later. The variable portion 16 shown in FIG. 2 is eight bits in length. In this example, the variable portion 16 may include redundancy information or may include secondary channel data, as will be described below. It should be noted that the overall frame length of the frame 10 shown in FIG. 2 is the same as that shown in FIG. 1 for simplicity of discussion.

In the communications system, data is transmitted from a transmit station to a receive station. For purposes of illustration, the transmit station will be assumed to be a cellular radio base station while the receive station will be assumed to be a mobile cellular phone. The choice of these particular components is merely for the sake of convenience of description and because their details are well known in the art, except as elaborated on herein. Of course, any CRC encoding source may be substituted for the base station, whether composed of single or multiple components, and any CRC decoder may be substituted for the phone, likewise whether composed of single or multiple components, without departing from the scope of the present invention. In addition, the roles of the two stations may be reversed without departing from the scope of the present invention.

Figure 3:
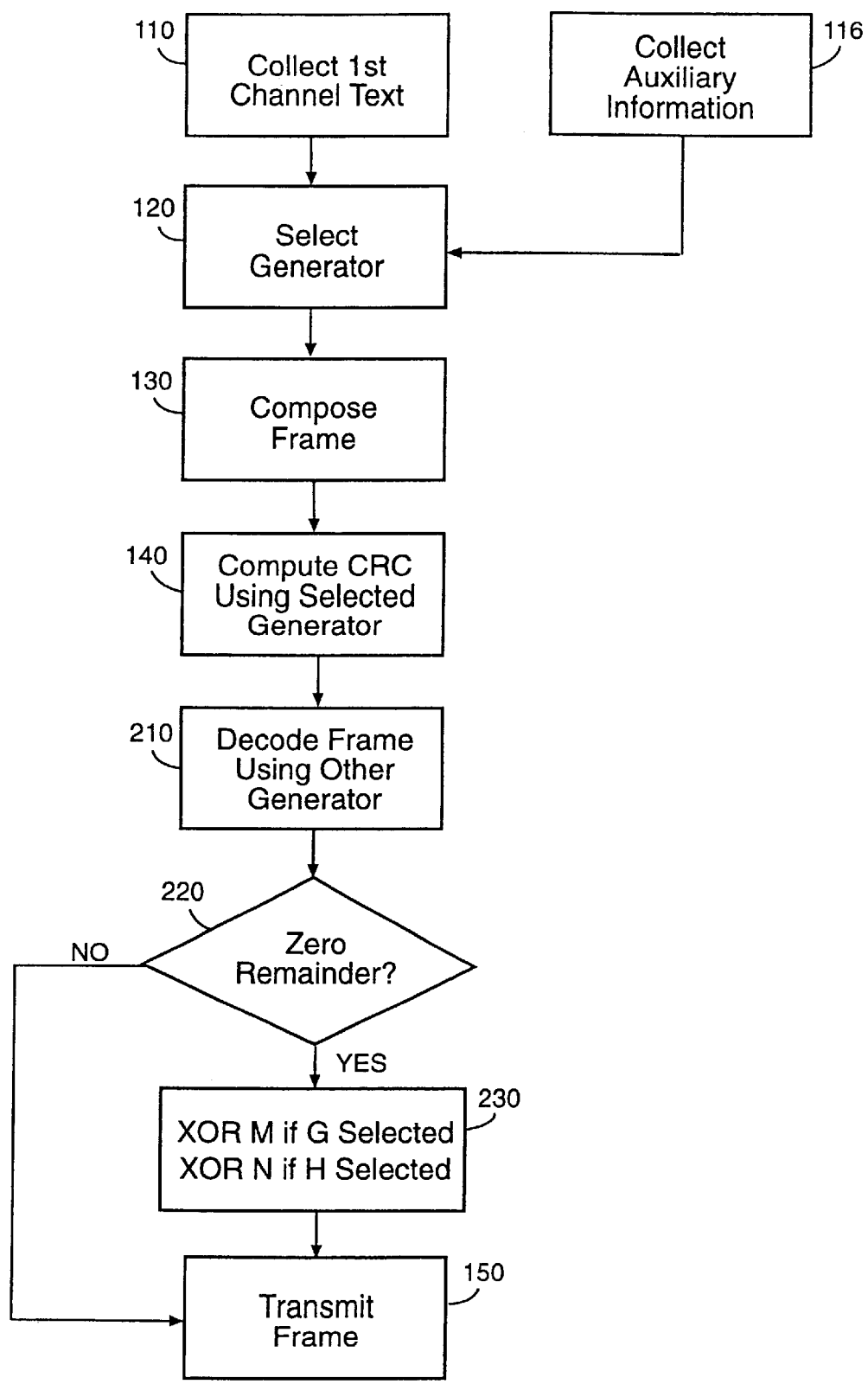
FIG. 3 shows the process flow on the transmit side for one embodiment of the present invention.

FIG. 3 shows the operation of the base station according to the present invention. The encoding portion of the base station collects the text to be protected (box 110), from either an internal or an external source. Applying the OSI reference model well known in the art, this step is typically accomplished by a first protocol stack passing down the text to the layer at which the present invention is carried out, which in practice would most likely be Layer 1, Layer 2, or an intermediate MAC layer. In addition, the encoding portion of the base station also collects auxiliary information (box 116), typically passed down along a second protocol stack. The auxiliary information may include an instruction that specifies which of a plurality of generator polynomials should be selected, as discussed below. In addition, the auxiliary information may include additional text to be carried over the secondary channel (second channel data).

In order to compose the encoded message frame 10, a CRC encoder associated with the base station is provided with first and second generating polynomials, G and H, respectively, which may have different degrees. When a frame 10 containing protected text is to be transmitted, the generating polynomial to be used by the encoder is selected (box 120), typically by the base station's main controller, but optionally by any other part of the base station. The selection between G or H may depend on observations concerning channel performance, such as estimates of bit-error ratios, the short-term average number of retries in an ARQ system, the confidence level of demodulated soft information, and so forth in any manner known in the art. Optionally, the selection of the generating polynomial may depend on the type of data being transmitted and/or on the presence, absence, or logical value of text to be transmitted on the secondary channel.

Once the generating polynomial is selected (box 120), in this example H, the message portion 12 of the frame is composed (box 130) and the CRC encoder computes and appends the appropriate redundancy bits for the text in a manner well known in the art (box 140), typically by appending the redundancy bits to the main text. In addition, the base station also preferably decodes the composed frame 10 using the un-selected generating polynomial, G in this example (box 210). Equivalently, the base station may compute the appropriate redundancy bits for the text using the other (unselected) generating polynomial rather than decoding. In either case, the purpose of this additional computation is to detect ambiguity, which occurs when the text to be encoded has both G and H as a factor, and therefore decodes correctly according to both G and H. If the frame 10 decodes with a non-zero remainder (box 220), meaning ambiguity is not detected, the encoded text is transmitted conventionally (box 150). If, on the other hand, the frame 10 decodes with a zero remainder (box 220), indicating an ambiguity, further processing is needed to resolve this ambiguity prior to transmission.

The ambiguity may be resolved by altering the frame 10 prior to transmission so as to remove the ambiguity. In the present invention, the ambiguity may be removed by adding, through an exclusive OR operation (XOR), a third or fourth polynomial to the frame 10 (box 230). For instance, if G was the selected generating polynomial, a third polynomial M—which is relatively prime with respect to G and H—is added (XOR) to the frame 10 (box 230). If, on the other hand, H was the selected generating polynomial, a fourth polynomial N—which is relatively prime with respect to G and H, and preferably with respect to M—is added to the frame 10 (box 230). Thus, when the generator polynomial G is used to encode, the frame 10 is altered by XOR with the polynomial M; when the generator polynomial H is used to encode, the frame 10 is altered by XOR with the polynomial N. After this further processing (box 230), the encoded message frame 10 is transmitted in a conventional fashion, such as by passing the encoded message down the protocol stack to the physical layer for transmission (box 150).

Figure 4:
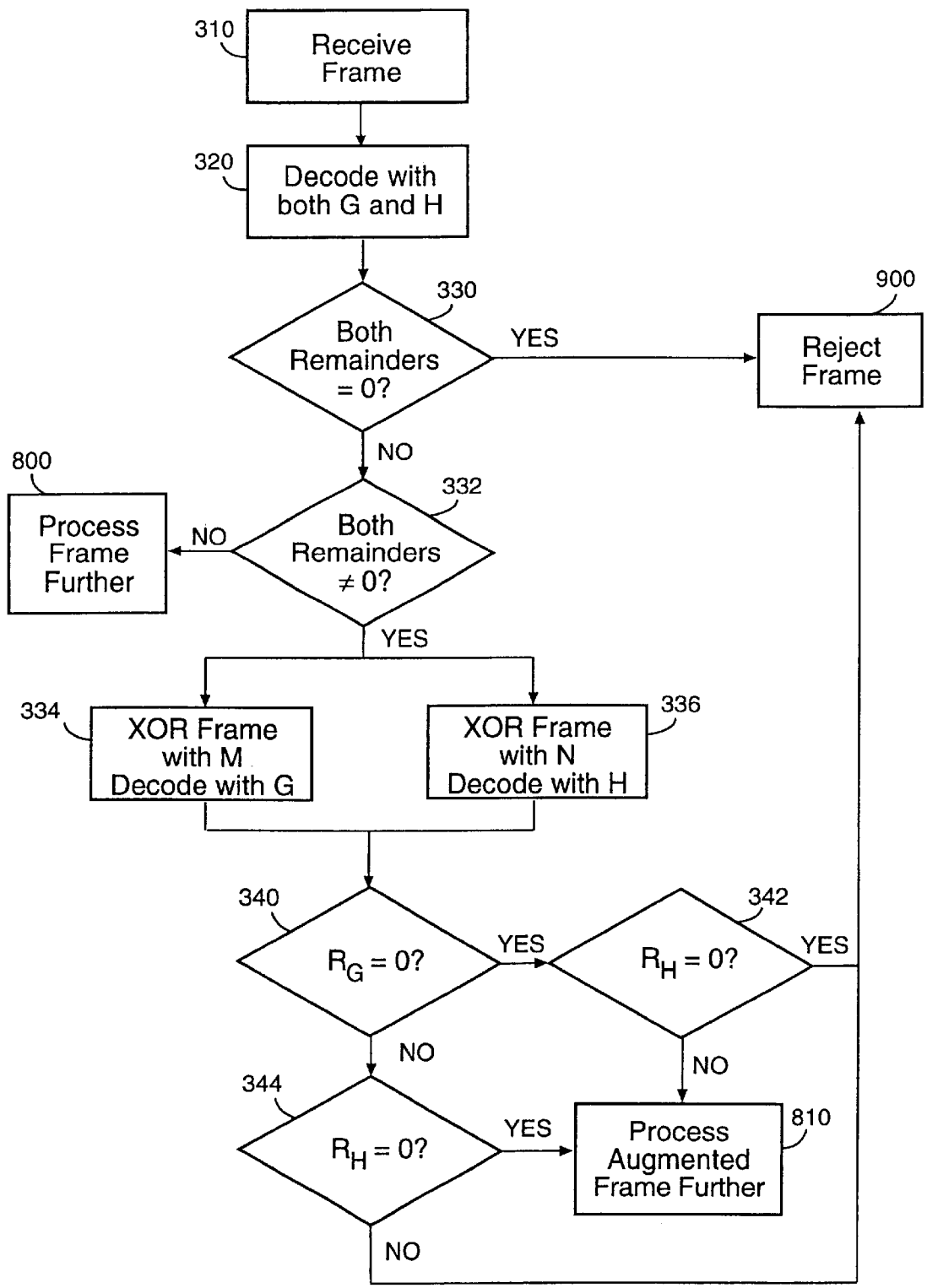
FIG. 4 shows the process flow on the receive side for one embodiment of the present invention.

At the receiving end, the phone receives the frame 10 (box 310), as shown in FIG. 4. The encoded frame 10 is then CRC decoded using both G and H (box 320). That is, the encoded message is CRC decoded with G, in a manner well known in the art (i.e., a remainder is computed according to conventional methods for CRC operation), to produce a first resulting remainder ($R_G$) (box 320). The encoded message is also CRC decoded with H to produce a second resulting remainder ($R_H$) (box 320). If both $R_G$ and $R_H$ are zero (box 330), the encoded message has decoded properly according to both G and H. Since, in the preferred embodiment, the transmitted message should never meet this condition (see boxes 220–230 of FIG. 3), transmission errors must have occurred, and the frame 10 is rejected (box 900). The rejected frame 10 is then processed according to known procedures, such as by requesting a retransmission.

If $R_G$ or $R_H$, but not both, are non-zero (box 332), meaning that the encoded message decodes properly according to G or H, but not both, the frame 10 is deemed sound, and the message portion 12, and optionally the variable portion 16, are passed on for further processing as discussed below (box 800).

If both $R_G$ and $R_H$ are non-zero (box 332), then the encoded message is processed further to potentially undo the M or N alterations made at the transmit end. To do so, polynomial M is added and the frame 10 and the M-augmented frame 10 is decoded using generator polynomial G (box 334). Further, polynomial N is added to the frame 10 and the N-augmented frame 10 is decoded using generator polynomial H (box 336). If the frame 10 does not decode properly in either of these cases (boxes 340, 344), or if it decodes properly in both cases (boxes 340,342), transmission errors have occurred, and the frame 10 is rejected (box 900). Otherwise, the augmented frame 10 (as unraveled by N or M) is deemed sound, and the message portion 12, and optionally the variable portion 16, are passed on for further processing as discussed below (box 810).

In a simple embodiment, the processing of the decoded frame 10 (box 800 or 810) is rather straightforward. The message portion 12 of the encoded message, which is of constant length, is simply processed conventionally in a manner well known in the art. This scenario corresponds to a simple single channel transmission using varying degrees of redundancy error coding. For instance, assume that G is the sixteen bit generating polynomial used as a default in the communications system. Further, assume that H is an eight bit generating polynomial. If G is used as the generating polynomial, the degree of redundancy is effectively twice that of when H is used as the generating polynomial. It should be noted that the frame length in this simple embodiment may be fixed or may vary. If the frame length is variable, the frame 10 would include the message portion 12 and the redundancy portion 14, but only include the variable portion 16 when the larger generating polynomial (G) is used. Thus, the variable portion 16, when present, would include redundancy information that, when combined with the redundancy information in the redundancy portion 14, would comprise the redundancy error coding data (e.g., the CRC remainder).

In a more complex embodiment, the processing of the decoded frame 10 (box 800 or 810) branches depending on whether G or H was used as the generating polynomial, as determined by the phone. In the example given, H is used when there is a secondary channel "phantomed" onto the primary channel, and G is used when there is no secondary channel present. Continuing with the sixteen bit G and the eight bit H from above, the use of H frees up eight bits for use as a relatively low-bandwidth secondary channel, while the use of G allows for no such secondary channel. When the phone determines that G has been used, the phone processes the message portion 12 of the encoded message in a conventional fashion. In contrast, when the phone determines that H has been used, the phone processes the message portion 12 of the encoded message in a conventional fashion but also processes the variable portion 16 of the encoded message as a secondary channel. As can be seen in this embodiment, the variable portion 16 provides redundancy information when G is used, but includes secondary channel data when H is used. Further, it is preferable that the frame length remain constant using this embodiment, but this is not required.

In the examples above, when the longer sixteen bit generating polynomial G is used, the message portion 12 of the frame 10 is CRC encoded, but the variable portion 16 is not encoded using G since it forms a portion of the redundancy information itself. On the other hand, when the shorter eight bit generating polynomial H is used, the variable portion 16 may or may not be encoded using H. For instance, the main protected text and the secondary channel data may be combined, and then the combination may be CRC encoded using H to produce the redundancy portion 14. Or, the protected text may be CRC encoded using H to produce the redundancy portion 14 and then the variable portion 16 containing the secondary channel may be added.

Continuing along those lines, the present invention may be used with a fixed frame length having a variable length message portion 12. For instance, when using G to encode, the message length may be K bits, but when using H to encode, the message length may be K plus eight bits. With such an arrangement, the both the base station's and the phone's ambiguity resolution procedure would need to account for the variable length. For instance, K bits would be decoded with G and K plus eight bits would be decoded with H, and the two results compared to determine if there may be an ambiguity. Thus, the extra bits saved by using the shorter generating polynomial could be used to increase the number of bits dedicated to the primary channel message within a fixed length frame 10.

The examples above have assumed that the shorter generating polynomial, H, is half the degree of the default generating polynomial, G. However, this relationship in degree is not required. Indeed, H may be of less degree than G by one bit, two bits, up to the degree of G minus one. Thus, the "size" of the phantom secondary channel may be varied.

Further, in some embodiments, the two generating polynomials, G and H, may be different polynomials of the of the same degree. Such a method may be used simply to provide varying degrees of redundancy error coding. Alternatively, the simple choice of which generating polynomial to be used may be used to convey information. For instance, if the primary channel data carries voice information, generating polynomial G is used, while if the primary channel data carries non-voice data, generating polynomial H is used. The phone could then process the data differently depending on which generating polynomial the phone determines has been used by the base station. Thus, the ability to use two different generating polynomials may be used to help convey information even though the generating polynomials are of the same degree.

Additionally, although the invention is described above in terms of two generating polynomials, G and H, the approach can be extended in a straightforward way to more than two generating polynomials, and the invention is intended to encompass such situations.

Clearly, the present method increases the processing overhead for the receiver, and typically the transmitter. Rather than CRC decoding using only one generating polynomial, the receiver must CRC decode using both at least first and a second generating polynomials (G and H in the example). Further, in some embodiments, additional CRC decoding steps are required to undo alterations made at the transmit end intended to resolve ambiguities. Thus, the present method is more computationally intensive than the prior art. However, the present method allows for greater flexibility and transmission capacity. Further, some optional embodiments allow for the transmission of a phantom second channel superimposed over a first channel without violating established protocols. That is, a device using the present invention may still receive and process messages from existing systems not employing this invention; the device will simply engage in some needless calculations. Thus, such a device would be backward compatible with the existing systems. This is a great advantage in systems where the slots in the relevant protocol for transmitting flag-type information are all used or otherwise unavailable.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of variable degree error coding, comprising:
   selecting between a plurality of levels of error protection, each of said error protection levels having a different corresponding generator code;
   CRC encoding a data message at a first station using the generator code corresponding to the selected error protection level to produce an encoded message;
   transmitting said encoded message from said first station to a second station;
   at said second station, CRC decoding said encoded message using a first generator code to produce a first result and CRC decoding said encoded message using a second generator code to produce a second result; and
   determining, at said second station, the selected error protection level based on said first and second results.

2. The method of claim 1 further including processing said data message at said second station based on the determined error protection level.

3. The method of claim 1 wherein said encoded message includes a variable portion optionally having second channel data or redundancy information therein and further including processing said variable portion based on the selected error protection level determined by said second station.

4. The method of claim 1 wherein said second generator code is of a lesser degree than said first generator code.

5. The method of claim 1 wherein said transmitting said encoded message includes transmitting a frame having a fixed frame length and including said encoded message.

6. The method of claim 1 wherein said transmitting said encoded message includes transmitting a frame including said encoded message and having a frame length that varies depending on which generator code is selected.

7. The method of claim 1 further comprising preliminarily:
   evaluating channel performance of a wireless communication link between said first and second stations, and
   wherein selecting between a plurality of levels of error protection comprises selecting a generator code from a plurality of known generator candidates based on said evaluating.

8. The method of claim 7 wherein selecting the generator code from the plurality of known generator candidates based on said evaluating comprises selecting the generator code from a plurality of known generator candidate polynomials of equal degree.

9. The method of claim 7 wherein selecting the generator code from the plurality of known generator candidates based on said evaluating comprises evaluating an error detection rate associated with the wireless communication channel.

10. The method of claim 1 further comprising
    evaluating a block length of said data message said first and second stations prior to selecting between a plurality of levels of error protection; and
    wherein selecting between a plurality of levels of error protection comprises selecting a generator code from a plurality of known generator candidates based on said evaluating.

11. A method of variable degree error coding, comprising:
- selecting between a plurality of levels of error protection, each of said error protection levels having a different corresponding generator code;
- CRC encoding a data message at a first station using the generator code corresponding to the selected error protection level to produce an encoded message;
- transmitting said encoded message from said first station to a second station;
- at said second station, CRC decoding said encoded message using a first generator code to produce a first result and CRC decoding said encoded message using a second generator code to produce a second result;
- determining, at said second station, the selected error protection level based on said first and second results; and
- wherein said encoding said data message at said first station to produce said encoded message includes checking said encoded message for ambiguity prior to said transmitting.

12. The method of claim 11 wherein said checking said encoded message for ambiguity includes CRC decoding said encoded message using a generator code corresponding to an un-selected error protection level.

13. The method of claim 11 wherein said checking said encoded message for ambiguity includes CRC encoding said data message using a generator code corresponding to an un-selected error protection level.

14. The method of claim 11 further including altering said encoded message prior to said transmitting if ambiguity is found.

15. The method of claim 14 wherein said altering includes XOR adding either a first or second polynomial to said encoded message if said first generator code or second generator code, respectively, was used to produce said encoded message.

16. A method of variable degree error coding, comprising:
- selecting between a plurality of levels of error protection, each of said error protection levels having a different corresponding generator code;
- CRC encoding a data message at a first station using the generator code corresponding to the selected error protection level to produce an encoded message;
- transmitting said encoded message from said first station to a second station;
- at said second station, CRC decoding said encoded message using a first generator code to produce a first result and CRC decoding said encoded message using a second generator code to produce a second result; and
- determining, at said second station, the selected error protection level based on said first and second results, wherein said determining the selected error protection level includes altering said encoded message to produce an augmented encoded message if both said first result and said second result are non-zero.

17. The method of claim 16 wherein said altering includes:
a) XOR adding a first polynomial to said encoded message to create a first candidate augmented message and thereafter CRC decoding said first candidate augmented message using said first generator code to produce a third result;
b) XOR adding a second polynomial to said encoded message to create a second candidate augmented message and thereafter CRC decoding said second candidate augmented message using said first generator code to produce a fourth result; and
c) producing said augmented encoded message based on said third and fourth results.

18. A method of decoding a communications message produced using cyclic redundancy check (CRC) error coding, comprising:
a) receiving a frame having a frame length at a receiving station, said frame having a message portion and a redundancy portion,
   i) said message portion having a message characteristic;
   ii) said redundancy portion having primary redundancy data therein;
   iii) said encoded message CRC encoded using a first generator code if said message characteristic has a first value;
   iv) said encoded message CRC encoded using a second generator code, different from said first generator code, if said message characteristic has a second value;
b) at said receiving station, CRC decoding said frame using said first generator code to produce a first result and CRC decoding said frame using said second generator code to produce a second result;
c) determining, at said second station, which generator code was used to prepare said frame based on said first and second results and further processing said message portion based on said determination.

19. The method of claim 18 wherein said message characteristic is the length of said message portion.

20. The method of claim 18 wherein said message characteristic indicates if said message portion includes voice information.

21. The method of claim 18 wherein said second generator code is of the same degree as said first generator code.

22. The method of claim 18 wherein said frame length is fixed.

23. The method of claim 18 wherein said frame length varies with the length of said message portion.

24. The method of claim 18 wherein said frame length varies with the length of said generator code used to encode said message portion.

25. A method of decoding a communications message produced using cyclic redundancy check (CRC) error coding, comprising:
a) receiving an encoded message having a fixed length at a second station, said encoded message having a first fixed length message portion, a redundancy portion, and a variable portion,
   i) said first message portion having first channel data therein;
   ii) said redundancy portion having primary redundancy data therein;
   iii) said variable portion selectively including secondary redundancy information or second channel data therein;
   iv) said encoded message CRC encoded using a first generator code if said variable portion includes secondary redundancy information;
   v) said encoded message CRC encoded using a second generator code, different from said first generator code, when said variable portion includes second channel data;
b) at said second station, CRC decoding said encoded message using said first generator code to produce a first result and CRC decoding said encoded message using said second generator code to produce a second result;

c) determining, at said second station, which generator code was used to prepare said encoded message based on said first and second results; and d) determining, at said second station, what is contained within said variable portion of said encoded message based on which generator code was used to prepare said encoded message.

26. A method of decoding a communications message produced using cyclic redundancy check (CRC) error coding, comprising:

receiving an encoded message having a fixed length at a second station, said encoded message having a first fixed length message portion, a redundancy portion, and a variable portion, said first message portion having first channel data therein;

said redundancy portion having primary redundancy data therein;

said variable portion selectively including secondary redundancy information or second channel data therein;

said encoded message CRC encoded using a first generator code if said variable portion includes secondary redundancy information;

said encoded message CRC encoded using a second generator code, different from said first generator code, when said variable portion includes second channel data;

at said second station, CRC decoding said encoded message using said first generator code to produce a first result and CRC decoding said encoded message using said second generator code to produce a second result;

determining, at said second station, which generator code was used to prepare said encoded message based on said first and second results, wherein said determining which generator code was used to prepare said encoded message includes altering said encoded message to produce an augmented encoded message if both said first result and said second result are non-zero; and determining, at said second station, what is contained within said variable portion of said encoded message based on which generator code was used to prepare said encoded message.

27. The method of claim 26 wherein said altering includes:

a) XOR adding a first polynomial to said encoded message to create a first candidate augmented message and thereafter CRC decoding said first candidate augmented message using said first generator code to produce a third result;

b) XOR adding a second polynomial to said encoded message to create a second candidate augmented message and thereafter CRC decoding said second candidate augmented message using said first generator code to produce a fourth result; and c) producing said augmented encoded message based on said third and fourth results.

28. A method of decoding a communications message produced using cyclic redundancy check (CRC) error coding, comprising:

a) preparing, at a first station, a CRC encoded message having a fixed length; said encoded message having a first fixed length message portion, a redundancy portion, and a variable portion;

i) wherein said first message portion includes first channel data;

ii) wherein said encoded message is prepared using a first generator code when said variable portion includes CRC redundancy information and wherein said encoded message is prepared using a second generator code when said variable portion includes second channel data;

b) receiving said encoded message at a second station on a first channel;

c) at said second station, CRC decoding said encoded message using said first generator code to produce a first result and CRC decoding said encoded message using said second generator code to produce a second result;

d) determining, at said second station, which generator code was used to prepare said encoded message based on said first and second results; and e) determining, at said second station, the meaning of said variable portion of said encoded message based on which generator code was used to prepare said encoded message.

29. A method of variable degree error coding, comprising:

selecting between a plurality of levels of error protection, each of said error protection levels having a different corresponding predetermined generator code;

CRC encoding a data message at a first station using the generator code corresponding to the selected error protection level to produce an encoded message;

transmitting said encoded message from said first station to a second station;

at said second station, CRC decoding the entirety of a first portion of said encoded message using a first generator code to produce a first result and CRC decoding the entirety of said first portion of said encoded message using a second generator code to produce a second result; and determining, at said second station, the selected error protection level based on said first and second results.

* * * * *